SELECTIVE ETCHING TECHNIQUE FOR SEMICONDUCTORS
Filed March 20, 1968
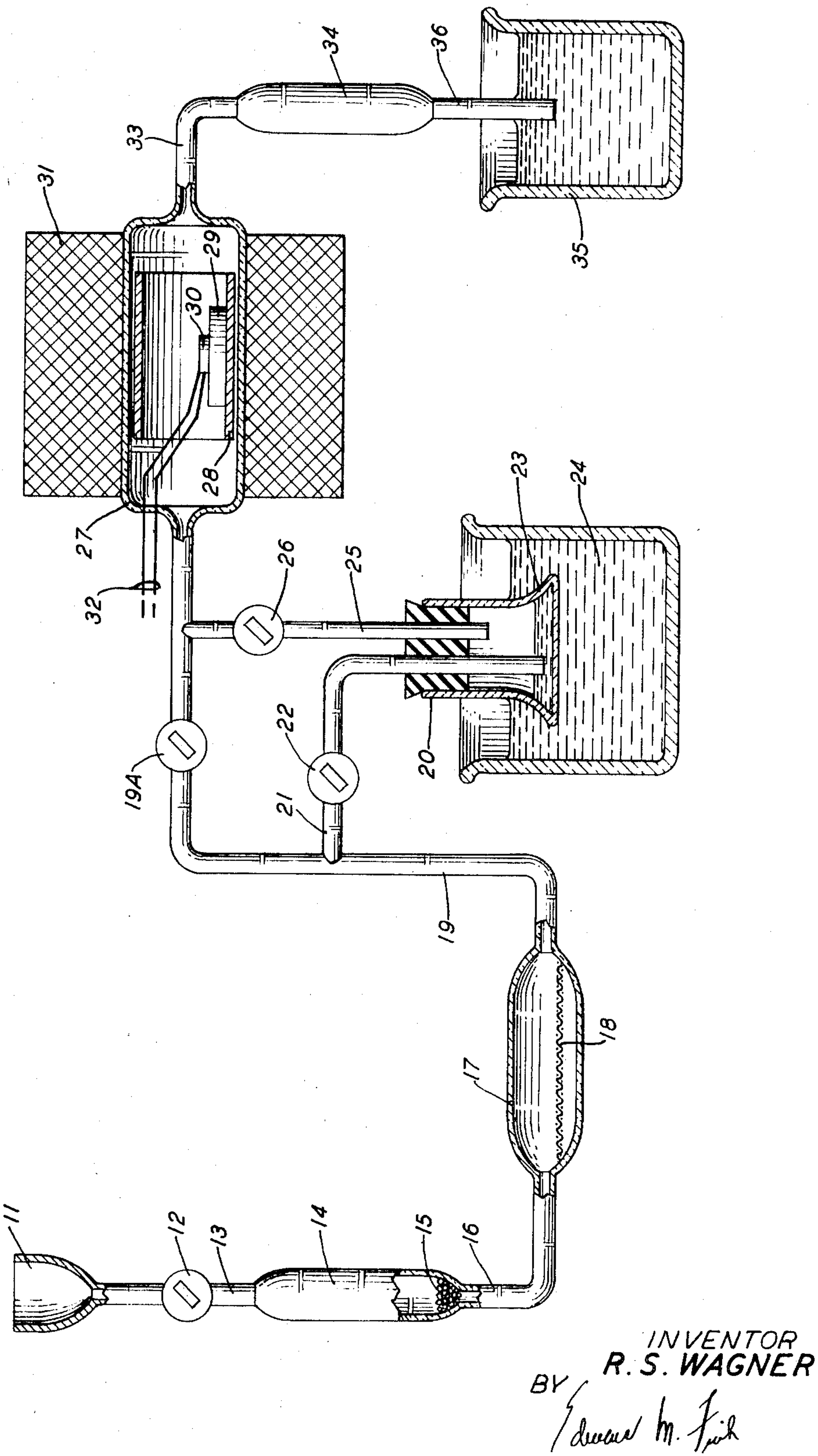
INVENTOR
R. S. WAGNER
BY Edward M. Fink
ATTORNEY United States Patent Office 3,592,706
Patented July 13, 1971

3,592,706
SELECTIVE ETCHING TECHNIQUE FOR SEMICONDUCTORS

Richard S. Wagner, Bernardsville, N.J., assignor to Bell Telephone Laboratories, Incorporated, Murray Hill, N.J.

Filed Mar. 20, 1968, Ser. No. 714,526
Int. Cl. H01l 7/50, 7/00
U.S. Cl. 156—17 6 Claims

ABSTRACT OF THE DISCLOSURE

Preferential etching of crystalline materials is effected by providing a liquid-alloy solution comprising the material to be etched and one or more other components at a point intermediate a vapor and the solid material to be etched. In the operation of the process, the vapor which is capable of reacting chemically with the material to be etched selectively removes that material from the liquid-alloy solution, so resulting in undersaturation of the solution with respect to the material to be etched and continuous dissolution of that material at the solid-liquid interface.

This invention relates to a technique for the selective etching of crystalline materials. More particularly, the present invention relates to selective etching process utilizing a solid-liquid-vapor mechanism.

The continued sophistication of the electronics industry has generated a need for precise techniques for selectively etching semiconductive materials. Although the diverse prior art procedures commonly employed for this purpose have proven satisfactory, continued interest has been expressed in the development of a procedure capable of being operated at temperatures appreciably lower than those employed by prior workers.

In accordance with the present invention, selective or preferential etching of a crystalline body is effected at temperatures appreciably below those utilized heretofore, upon the formation of a liquid-alloy zone, comprising the material to be etched and one or more other components, at a point intermediate a vapor and the solid material to be etched. In the operation of the process, a vapor including a material capable of reacting chemically with the material to be etched is contacted with the liquid-alloy zone, so resulting in removal of that material from the liquid-alloy zone at the liquid-vapor interface and undersaturation thereof with respect to the material to be etched. Operation as described results in continuous etching of the crystalline body, removal of the crystalline material in the vapor phase and the concurrent formation of a "negative whisker" or hole.

The invention will be more readily understood by reference to the following detailed description taken in conjunction with the accompanying drawing wherein:

The figure is a schematic front elevational view of a typical apparatus employed in the practice of the present invention.

The practice of the present invention invelves the selective etching of a crystalline body in accordance with a solid-liquid-vapor mechanism. Briefly, the technique involves etching a crystalline body comprising a first material by a process wherein a second material comprising a liquid solution containing agent and the first material is contacted with a vapor containing a material capable of removing the first material from the liquid solution at the site of the vapor-liquid interface, the agent being maintained in the solution at a temperature above the initial freezing temperature of the solution, but below the melting point of the first material. Vapor-solution contact is continued for a time period sufficient to undersaturate the liquid solution with respect to the first material, so resulting in the initiation of etching of the crystal at the site of the liquid-solid interface. The term "agent," as applied herein, denotes a broad class of operative materials which may be employed in the practice of the present invention. Agents may be selected from among elements, compounds. solutions, or multiphase mixtures such as eutectic compositions.

Agents employed in the practice of the invention desirably evidence a vapor pressure over the liquid solution of the order of a few millimeters of mercury or less in order to avoid excess loss thereof. It will be evident from the requirements outlined that the constituent or constituents of the agent must evidence a distribution coefficient, $k$, less than unity, $k$ being defined as the ratio of the concentration of the constituent or constituents of the agent in the crystalline material being etched to its concentration in the liquid solution from which the material to be etched is removed. This requirement implies that the agent must form a liquid alloy with the crystalline material to be etched at a temperature which is lower than the melting point of the material to be etched. Selection of a particular agent having desired minimum or maximum values of $k$ is dependent upon the specific material to be etched and the vapor transport reaction selected.

Still another property influencing the selection of an agent is the wetting characteristic of the liquid solution containing the agent with respect to the substrate to be etched. Thus, for example, in the growth of acicular holes, it may be desirable that the contact angle between the liquid solution and the material to be etched be as high as 90°, whereas in the growth of large area holes by means of thin layers of liquid solution, it is generally preferred that the contact angle be small, ranging down to 0°.

As indicated, reaction of a vaporous material is initiated at the site of the agent, a requirement being that the agent be placed at the desired site of etching in an independent manipulative step. Several techniques are available for producing the agent at the desired site of etching. For example, it may be convenient to place the agent on the region to be etched by manual means or to deposit films of the agent of prescribed thickness by evaporation, electroplating, and so forth. Furthermore, masks may be employed as desired to form specific arrays or patterns. The vaporous etchant may be furnished by any of the well known transport processes and may be admixed with an inert carrier gas, typical reactions being set forth below:

Reactions (a) $Si(1)+SiCl_4(g)\rightarrow 2SiCl_2(g)\uparrow$
(b) $Si(1)+4HCl\rightarrow SiCl_4(g)\uparrow+2H_2\uparrow$
(c) $Si(1)+4HBr\rightarrow SiBr_4(g)\uparrow+2H_2\uparrow$
(d) $Ge(1)+GeCl_4(g)\rightarrow 2GeCl_2(g)\uparrow$
(e) $Ge(1)+2H_2+2Br_2\rightarrow GeBr_4(g)\uparrow+2H_2\uparrow$
(f) $Ge(1)+2H_2+2I_2\rightarrow GeI_4(g)\uparrow+2H_2\uparrow$ With reference now more particularly to the figure, there is shown a schematic front elevational view of an apparatus suitable for the etching of a crystalline body by the described technique.

The apparatus shown includes a source of an inert gas, a saturating system and a reaction chamber. An inert gas is admitted into the system from source 11 controlled by valve 12, and passes via conduit 13 through a purification trap 14 containing purification medium 15, via conduit 16, and proceeds to a second trap 17 containing a purification medium 18. The now purified gas emerges from trap 17 via conduit 19, controlled by valve 19A, and may pass directly into the reaction chamber 27 or first through a saturator 20 by means of conduit 21 controlled by valve 22, saturator 20 containing a suitable liquid 23. Control of the ratio of vaporized liquid 23 to inert gas is maintained by refrigerating saturator 20 with a suitable cold bath 24. Inert gas passing through saturator 20 emerges together with vaporized liquid 23 via conduit 25 controlled by valve 26 and proceeds to reaction chamber 27. Chamber 27 may be a fused silica tube, typically having disposed therein a cylinder 28 containing a pedestal 29 upon which a crystal 30 may be positioned. Chamber 27 is suitably heated by means of RF heater 31, the temperature of the crystal to be etched 30 being measured by thermocouple 32. The gaseous products from the reaction emerge from chamber 27 via conduit 33 and pass through trap 34 and on the exhaust system by means of conduit 36.

The present invention is conveniently described in detail by reference to an illustrative example in which a silicon crystal is selectively etched by silicon tetrachloride, platinum being employed as the agent, utilizing an apparatus similar to that shown in the figure.

An oriented single crystal of silicon is chosen as the material to be etched and initially ground flat with a suitable abrasive. Silicon tetrachloride is chosen as the reactive gas and is inserted in liquid form in saturator 20, argon being chosen as a carrier gas.

Thereafter, small particles of platinum are placed by manual means upon crystal 30 which is then positioned upon pedestal 29. Next, with valves 22 and 26 in the open position, argon is permitted to flow through the system. Then, heater 31 is turned on and reaction chamber 27 heated to a temperature sufficient to alloy the platinum with the silicon, so resulting in a plurality of molten alloy droplets containing platinum and silicon.

Thereafter, valves 22 and 26 are turned to the open position, valve 19A closed and the removal of silicon from the liquid-alloy solution by means of chemical reaction thereof with silicon tetrachloride initiated. The conditions employed in such techniques are well known to those skilled in the art.

During the course of the processing, silicon is preferentially removed from the liquid-alloy solution at the liquid-vapor interface, so resulting in undersaturation of the solution with respect to silicon. In order to establish equilibrium in the system, however, silicon will continuously be dissolved from the substrate crystal, thereby resulting in the formation of a negative whisker or hole.

It will be understood by those skilled in the art that platinum has been chosen as an agent on the basis of its low distribution coefficient and vapor pressure and the fact that it has little effect on the electrical properties of silicon. In much the same fashion, gold, palladium, silver, copper, nickel, and so forth, may be chosen, or, in fact, any agent meeting the general criteria; that is, that it be capable of forming a liquid solution comprising the agent and the material to be etched at a temperature below the melting point of the latter.

Examples of the present invention are described in detail below. These examples and the illustration above are included merely to aid in the understanding of the invention, and variations may be made by one skilled in the art without departing from the spirit and scope of the invention.

EXAMPLE I

This example describes the selective etching of a silicon crystal with a mixture of silicon tetrachloride in argon in an apparatus similar to that shown in the figure.

A silicon wafer, 15 mm. x 25 mm. x 1 mm. with (111) faces was chosen as the material to be etched. The silicon wafer was then ground flat with an abrasive paper and given a bright etch to expose undamaged crystal surfaces. The etching procedure involved treating for 3 minutes with a 1:1 solution of hydrofluoric and nitric acids, followed by a 4 minute treatment with a 1:2:6 hydrofluoric, acetic, and nitric acid solution. Next, the substrate was washed with deionized water and dried in an oven at 110° C.

Following, platinum dots aproximately 0.007" in diameter were sputtered upon the wafer at the desired site of etching and the wafer positioned upon pedestal 29 in the apparatus.

Next, with valves 22 and 26 in the closed position, and with valves 12 and 19A in the open position, argon was passed through the system. Then, RF furnace 31 was turned on and chamber 27 heated to 1000° C. for a period of 5 minutes, so resulting in the formation of a plurality of molten alloy droplets containing platinum and silicon.

Thereafter, valves 22 and 26 were opened and valve 19A closed, thereby permitting argon to pass through saturator 20 where silicon tetrachloride obtained from commercial sources was picked up and carried to chamber 27. Silicon was preferentially etched at the site of the liquid alloys for 1 hour. The flow of argon through the system was maintained within the range of 200 to 300 cc. a minute, and the molecular ratio of silicon tetrachloride to argon was maintained at approximately .1 to .01 by means of cold bath 24. The resultant negative whiskers or holes were approximately 0.010" in depth at each alloy site.

EXAMPLE II

The procedure of Example I was repeated at 700° C. utilizing a germanium wafer with (111) faces, gold as the agent and bromine as the etching gas. After 30 minutes, holes were found to be etched through the germanium wafer at each alloy site.

EXAMPLE III

The procedure of Example I was repeated at 800° C. utilizing evaporated gold as the agent. The silicon crystal was found to be preferentially etched at the site of the liquid alloy.

EXAMPLE IV

The procedure of Example III was repeated with the exception that subsequent to the growth negative whiskers, the process was reversed and hydrogen was substituted for the argon, so resulting in the growth of acicular crystals approximately 5 mm. in length in the holes.

While the invention has been described in detail in the foregoing specification and the drawing similarly illustrates the same, the aforesaid is by way of illustration only and it is not restrictive in character. The several modifications which will readily suggest themselves to persons skilled in the art are all considered within the scope of the invention, reference being had to the appended claims.

What is claimed is:

1. A process for the selective etching of a crystalline body comprising a first material, selected from the group consisting of silicon and germanium at a given site thereon, comprising providing a second material comprising an agent, selected from the group consisting of gold, palladium, silver, copper and nickel, at said site, the said agent being such that it is capable of forming a liquid solution comprising the said agent and the said first material, heating said first material and said agent in an inert atmosphere to form said liquid solution, contacting the said solution with a vapor comprising at least one component capable of reacting chemically with said first material, continuing the said contacting for a time sufficient to undersaturate the said solution with respect to the said first material by preferential removal therefrom at the liquid-vapor interface, thereby initiating preferential etching at the said site by dissolution of said first material at the solid-liquid interface.

2. Process in accordance with claim 1 wherein said crystalline body is silicon.

3. Process in accordance with claim 1 wherein said crystalline material is germanium.

4. Process in accordance with claim 2 wherein platinum is the agent.

5. Process in accordance with claim 3 wherein gold is the agent.

6. A method of forming a hole at a given site on a surface of a crystalline semiconductor substrate material capable of forming a liquid alloy with an agent that is inert to a reaction vapor, said substrate material being selected from the group consisting of silicon and germanium, said agent being selected from the group consisting of gold, palladium, silver, copper and nickel, which comprises:

applying the agent to the given site on the substrate;

heating the substrate and the agent in an inert atmosphere to form the liquid alloy at the given site; and exposing the liquid alloy to the reaction vapor which is capable of selectively etching the substrate material by effecting undersaturation of the liquid alloy with respect to said substrate material by continuous dissolution thereof at said site, thereby resulting in the formation of a hole thereat.

References Cited

UNITED STATES PATENTS 3,409,481 11/1968 Merkel et al. ---------- 156—17

JACOB H. STEINBERG, Primary Examiner

U.S. Cl. X.R.

148—1.62; 23—223.5; 156—345